May 14, 1963  W. J. FINOR ET AL  3,089,379
APPARATUS FOR MAKING BRAIDED CORD
Filed Sept. 16, 1960
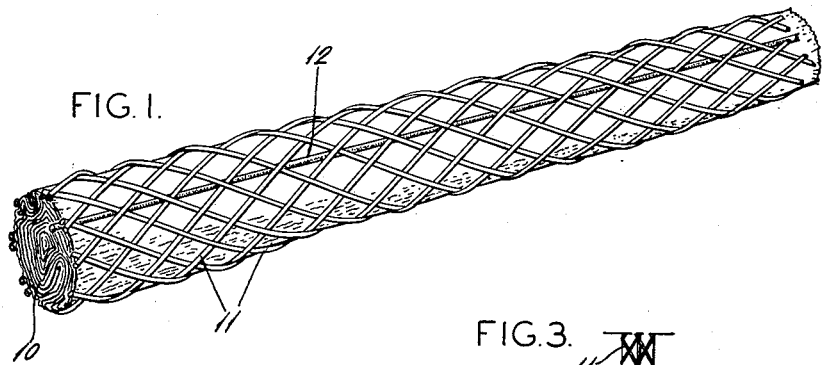
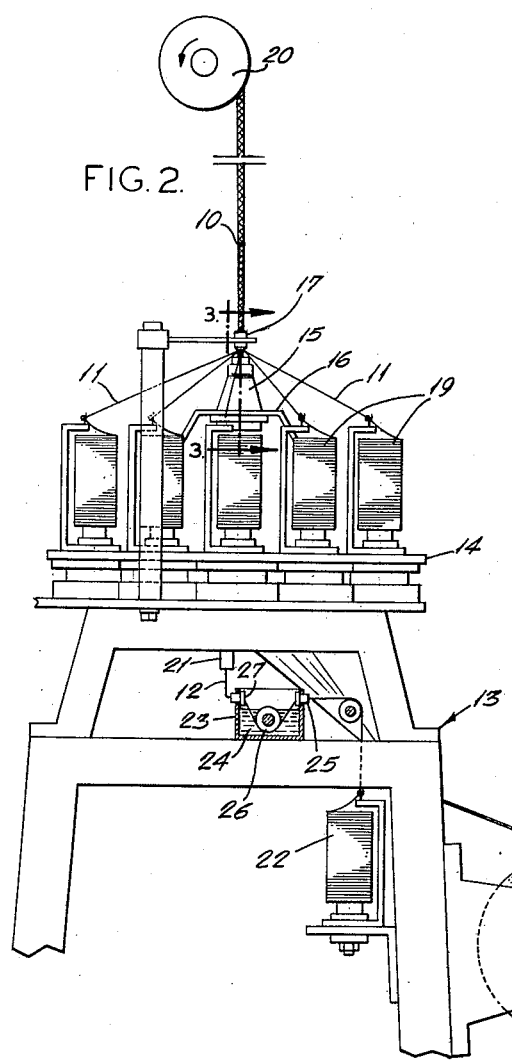
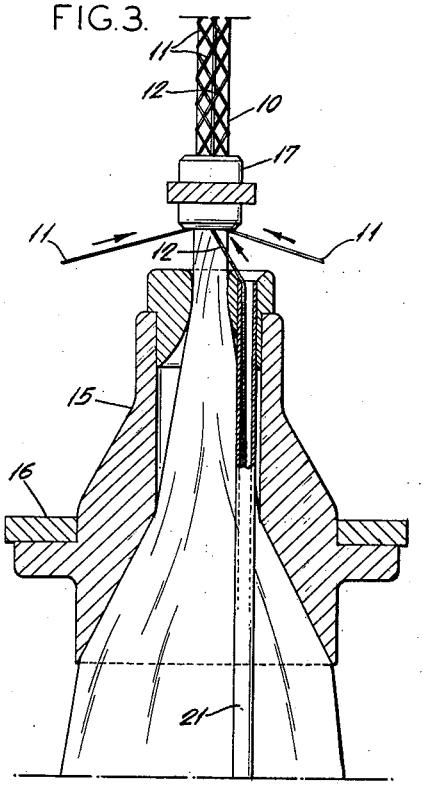
INVENTORS:
WALTER J. FINOR
WALTER S. ENGEL
BY Howson & Howson
ATTYS.

United States Patent Office 3,089,379
Patented May 14, 1963

3,089,379
APPARATUS FOR MAKING BRAIDED CORD
Walter J. Finor and Walter S. Engel, Philadelphia, Pa., assignors to E. W. Twitchell, Incorporated, Philadelphia, Pa., a corporation of Delaware
Filed Sept. 16, 1960, Ser. No. 56,574
1 Claim. (Cl. 87—23)

The present invention relates to new and useful improvements in braided or wrapped cellulose cord and in apparatus for manufacturing the same.

In the manufacture of cord such as braided or wrapped cellulose cord a central core of creped tissue is contained or held in a cylindrical shape by a jacket of fine threads braided or wrapped about the cord. A principal disadvantage of such cord has been a tendency to unwrap when cut. Prior to the present invention this tendency to unwrap has been retarded by applying a continuous strip of adhesive to the cord after the braiding or wrapping operation, for example, as disclosed in the Francis Patent No. 2,741,149, or by applying adhesive to the wrapping threads before the braiding or wrapping operation, for example, as disclosed in the Sackner Patent No. 2,250,776. Both of these above methods contain certain inherent disadvantages. For example, in the process of the Francis patent the quantity of adhesive applied to the cord may not be closely controlled as when a roller is used to apply adhesive to the cord the adhesive builds up on the roller and gradually a wider and heavier strip of adhesive is applied, giving a very rough texture to the cord. Additionally, a substantial quantity of adhesive must be applied to the cord of the Francis patent as there must be sufficient adhesive to go over the top of each individual thread and down along the sides of the threads to the core. In the Sackner patent the individual yarns contact adhesive carrying rings very briefly so that the adhesive must be freely available at the rings in order to coat the yarn. This results in dripping of the adhesive onto the braider head itself requiring frequent cleaning of the machine. The method of the Sackner patent also requires a substantial amount of adhesive to coat the plurality of threads.

With the foregoing in mind a primary object of the present invention is to provide a novel cord and apparatus for manufacturing cord wherein each of the individual wrapping and braiding strands may be secured to one another and to the core of the cord with a minimum of adhesive.

A further object of the present invention is to provide a novel cord and method and apparatus for manufacturing the cord wherein the quantity of adhesive used may be carefully controlled and wherein there is no possibility of the adhesive dropping onto the braiding or wrapping head of the machine forming the cord.

Still a further object of the present invention is to provide a novel cord and method and apparatus for manufacturing the cord which is of relatively simplified construction and entirely efficient and effective in use.

These and other objects of the present invention and the various features and details of the operation and construction thereof are hereinafter more fully set forth and described with reference to the accompanying drawings, in which:

FIG. 1 is a perspective view of a segment of a cord made in accordance with the present invention;

FIG. 2 is a side elevational view partially in section of apparatus for manufacturing the cord of the present invention; and FIG. 3 is an enlarged fragmentary transverse sectional view taken on line 3—3, FIG. 2, illustrating the formation of the core and the application of the adhesive carrying thread and wrapping threads about the core.

The cord of the present invention, as illustrated in FIG. 1 comprises a central core 10 formed of crushed paper or the like which is held in cylindrical shape by a jacket of fine threads 11 braided or wrapped about the core 10. The core can be formed of any type of compressible paper or the like. The types of paper more commonly used are cellulose wadding, facial tissue, and a paper commonly referred to as semi-crepe paper. The jacket 11 may be composed of threads of cotton, rayon, fiber glass, or other natural or synthetic fibers.

In accordance with the present invention, means are provided to adhesively secure the individual threads of the jacket 11 to the core 10 to prevent the jacket 11 from unraveling when the core is cut. This is accomplished in the present invention by providing an adhesive carrying thread or yarn 12 extending longitudinally of the core for the full length of the core between the core and the jacket. This bonding thread 12 may be any type of conventional threads and the size and type of thread may be varied in order to control the amount of adhesive required to bond various sizes and types of cord. Preferably, the adhesive applied to the thread 12 should be a relatively fast setting flexible adhesive which will set before the formed cord is fed to a takeup reel or the like and which will not interfere with the flexibility of the cord. One form of adhesive which is extremely suitable is a polyvinyl acetate adhesive but it will be readily apparent that any suitable adhesive may be used.

One form of apparatus for forming the cord and simultaneously applying the adhesive carrying thread 12 to the core is illustrated in FIGS. 2 and 3 of the drawing. As shown in FIG. 2, a conventional braiding machine 13 is provided having a standard braiding head 14 thereon with a die 15 positioned immediately above the center of the braiding head. The die 15 may be secured in place above the braiding head for example by means of a bracket 16 supported on the braiding machine. Positioned immediately above the die 15 is an eye 17 supported in spaced co-axial relation with the die. The cellulose paper forming the core 10 of the cord is supported in the form of a roll 18 adjacent the bottom of the machine and is drawn upwardly centrally of the machine, for example, by means of a conventional drive drum 20 through the die 15 and eye 17 where it is gathered or crushed together into generally circular cross-sectional shape to form the core. After the core leaves the die 15 and before it passes through the eye 17, the threads which make up the jacket 11 of the cord are drawn from spools or bobbins 19 carried by the braiding head and are wrapped or braided in the conventional manner upon the cord to hold the core in the desired shape. The construction and operation of this braiding head is conventional and well known in the art.

According to the present invention prior to braiding or wrapping the threads of the jacket about the core, an adhesive carrying yarn 12 is positioned in contact with the core and drawn upwardly through the eye 17 along the core while threads of the jacket are braided or wrapped about the core and the adhesive carrying yarn. The adhesive carrying yarn 12 is fed to the eye 17 through a feed tube 21 which in the illustrated embodiment of the present invention extends vertically of the braiding machine adjacent the central axis thereof passing through one side edge of the die and terminating adjacent the upper end of the die. The yarn 12 is drawn from a spool or bobbin 22 mounted on the frame of the braiding machine 13 beneath the braiding head 14.

As illustrated in FIG. 2, adhesive is applied to the yarn 12 from an adhesive can 23 mounted above the spool or bobbin 22 which contains a supply of suitable adhesive material 24. The yarn 12 enters the can through a guide 25, is caused to pass downwardly beneath the surface of the body of adhesive 24, for example, by means of a guide roller 26 and then is drawn out of the can through a die 27 from which it is directed upwardly through the tube 21. The size of the die opening 27 may be varied to vary the amount of adhesive picked up by the thread 12. Additionally, as set forth above, the size of type of thread 12 may be varied to also vary the amount of adhesive.

From the foregoing it will be apparent that the present invention provides a novel cord in which the threads of the jacket are secured to one another and to the core of the cord by an adhesive carrying thread. It will also be apparent that the present invention provides novel apparatus and methods for forming this cord wherein the adhesive carrying thread may be applied to the core through a feed tube or guide immediately after adhesive is applied to the thread so that the feed tube or guide prevents the adhesive material from dripping on to the braiding head of the braiding machine.

While a particular embodiment of the present invention has been illustrated and described herein it is not intended to limit the invention to such a disclosure and changes and modifications may be incorporated and embodied therein within the scope of the following claim:

We claim:

Apparatus for forming cord having an elongated resilient core of fibrous material and having a jacket formed of a plurality of strands positioned over the core with an adhesive-carrying thread positioned intermediate the jacket and core to adhesively secure the strands of the jacket to the core, comprising, a die having a central die opening extending therethrough, means to feed the core of resilient material through the die opening to form the core of resilient material into the desired cross-sectional shape, an eye member through which said core passes spaced from the die opening in the direction of feed of the core of resilient material, a braiding head positioned about said die operable to feed the strands of said jacket to said eye and form said jacket about said core, a guide tube extending in the direction of feed of said core and terminating outwardly adjacent said die opening operable to direct said adhesive-carrying thread into contact with said core intermediate said die opening and said eye, and means adjacent the end of said guide tube opposite the terminal end thereof to apply adhesive in liquid form to said thread.

References Cited in the file of this patent

UNITED STATES PATENTS

| | | |
|---|---|---|
| 1,970,376 | Hamberger | Aug. 14, 1934 |
| 2,041,418 | Katz | May 19, 1936 |
| 2,063,966 | Whitlock | Dec. 15, 1936 |
| 2,112,294 | Lilley | Mar. 29, 1938 |
| 2,146,966 | Lilley | Feb. 14, 1939 |
| 2,250,776 | Sackner | July 29, 1941 |
| 2,257,648 | Pierce | Sept. 30, 1941 |
| 2,741,149 | Francis | Apr. 10, 1956 |
| 3,002,334 | Yasuno | Oct. 3, 1961 |

FOREIGN PATENTS

| | | |
|---|---|---|
| 827,991 | France | Feb. 2, 1938 |